United States Patent

Hensen

[15] 3,670,209

[45] June 13, 1972

[54] PULSE GENERATOR COMPRISING SERIALLY CONNECTED MAKE AND BREAK RELAYS, TIMING CIRCUIT, FLIP-FLOP AND MONOSTABLE MULTIVIBRATOR

[72] Inventor: Harold R. Hensen, Winston-Salem, N.C.

[73] Assignee: Western Electric Company, Incorporated, New York, N.Y.

[22] Filed: May 3, 1971

[21] Appl. No.: 139,680

[52] U.S. Cl.........................317/135 R, 317/141 S, 307/147, 307/265, 328/131

[51] Int. Cl.........................H01h 47/00

[58] Field of Search....................307/247, 293, 265; 328/58, 328/131; 317/135 R, 141 R, 141 S

[56] References Cited

UNITED STATES PATENTS

| | | | |
|---|---|---|---|
| 2,433,254 | 12/1947 | Aiken | 317/135 R |
| 3,150,293 | 9/1964 | Fransson et al. | 317/141 R |
| 2,962,609 | 11/1960 | MacDonald | 317/135 R |
| 3,440,452 | 4/1969 | Boehm | 328/131 X |
| 3,486,044 | 12/1969 | Hirsch | 307/293 |
| 3,562,599 | 2/1971 | Dreitzler | 317/141 S |
| 3,571,731 | 3/1971 | Rabe | 328/131 |

*Primary Examiner*—Stanley D. Miller, Jr.
*Attorney*—W. M. Kain, W. L. Williamson and J. B. Hoofnagle

[57] ABSTRACT

Pulse signals are produced by serially connected make and break contacts of respective relays. A timing circuit turns a flip-flop on and off to correspond to the beginning and end of a pulse. When the flip-flop is turned on, the make contacts are closed to initiate a pulse and when the flip-flop is turned off, a monostable multivibrator causes the break contacts to open and end the pulse. The timing circuit includes an on selecting circuit and an off selecting circuit which operates independently of each other.

6 Claims, 1 Drawing Figure

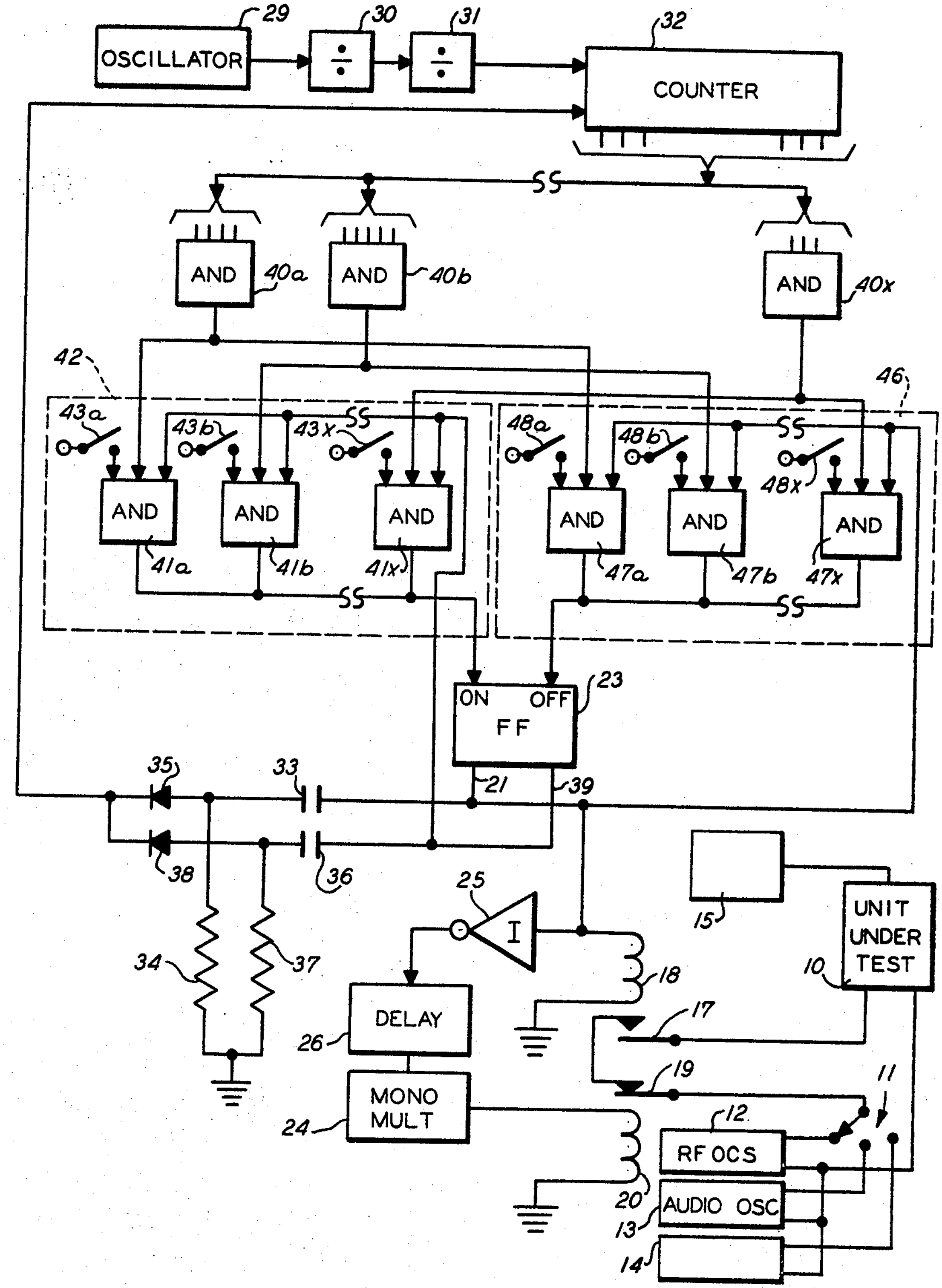
INVENTOR
H. R. JENSEN
By D. W. Marks
ATTORNEY

PULSE GENERATOR COMPRISING SERIALLY CONNECTED MAKE AND BREAK RELAYS, TIMING CIRCUIT, FLIP-FLOP AND MONOSTABLE MULTIVIBRATOR

BACKGROUND OF THE INVENTION

1. Field of the Invention

The invention relates to pulse generators and, in particular, to generators for producing accurately controlled pulsed signals. Such generators may be used in many different types of electronic equipment. One particular use for such a pulse generator is in a testing circuit for signaling units in communication transmission equipment. The signaling units are tested with pulsed audio frequency signals and pulsed power signals. The pulses may vary in width and/or in spacing between pulses.

2. Prior Art

The prior art describes a variety of circuits for producing pulsed signals. One class of pulse generating circuits utilizes electronic switching devices such as semiconductor elements. However, such circuits are incapable of effectively transmitting or handling a variety of signals including radio frequency, audio frequency, AC and DC power signals.

Other prior art circuits utilize relays which are capable of handling and transmitting a variety of signals. One prior art welding circuit described in U. S. Pat. 2,773,221 uses serially connected make and break contacts operated by respective relays. However, this circuit and the other prior art relay circuits have several deficiencies and disadvantages in producing the precisely controlled and variable pulses which are necessary for the testing of units such as signaling units.

SUMMARY OF THE INVENTION

An object of the invention is a new and improved pulse generator.

Another object of the invention is a new and improved circuit for operating serially connected make and break contacts to produce precisely controlled pulses.

In accordance with these and other objects, one embodiment of the invention incorporates a timing circuit for turning on and off a flip-flop at precise times corresponding to the beginning and end of a pulse. A make relay is operated when the flip-flop is turned on and a monostable multivibrator operates a break relay when the flip-flop is turned off. The output of the monostable multivibrator is set for a predetermined period to lap over the time when the make relay opens due to the turning off of the flip-flop.

Another feature of the invention incorporates an on selecting circuit and an off selecting circuit which operates independently of each other. The on selecting circuit is operated by a first count of a counter to turn the flip-flop on and the off selecting circuit is operated by a second count of the counter to turn the flip-flop off.

BRIEF DESCRIPTION OF THE DRAWING

The drawing shows a bock diagram of a pulse generator constructed in accordance with the principles of the invention.

DETAILED DESCRIPTION

Referring to the accompanying drawing there is shown a circuit for applying pulsed signals to a unit under test 10 which, for example, may be a signaling unit used in communication equipment. A stepping switch 11 selectively connects a radio frequency oscillator 12, an audio oscillator 13 or power source 14 in series with make contacts 17 of a relay 18, break contacts 19 of a relay 20 and the input of the unit under test 10. The make contacts 17 are closed and the break contacts 19 are opened to apply precisely controlled pulses of signals from the selected source 12, 13 or 14 to the unit under test 10. Conventional equipment 15, such as an oscilloscope or digital measuring equipment, is operated to determine one or more characteristics of the unit under test.

The relay 18 is operated by the output 21 of a flip-flop or bistable multivibrator 23 when the flip-flop is turned on or in a first state. The relay 20 is operated by a pulse from a monostable multivibrator 24 which is triggered by the flip-flop 23 turning off or changing to a second state to apply a signal through an inverter 25 to the monostable multivibrator 24. When the flip-flop 23 turns off, the make contacts 17 open at an unprecise delayed time. However, the opening of the break contacts 19 can be precisely controlled to end the pulsed signal. The pulse from the monostable multivibrator 24 has predetermined duration sufficient to insure that the make contacts 17 open while the break contacts 19 are open. When the flip-flop 23 turns on to operate the relay 18, there is a delay of approximately 1.9 milliseconds before the contacts 17 are actually closed. When the relay 20 is operated, there is a delay of approximately 1.6 milliseconds before the contacts 19 open. A delay circuit 26 is interposed between the inverter 25 and the monostable multivibrator 24 to provide a delay of approximately 0.3 millisecond. This makes the closing of the contacts 17 and the opening of the contacts 19 correspond directly to the on and off times respectively of the flip-flop 23.

The timing circuit for operating the flip-flop 23 includes an oscillator 29 which is coupled by dividing circuits 30 and 31 to a binary counting circuit 32. A differentiating circuit consisting of a capacitor 33, a resistor 34 and a diode 35 connected to the output 21 produces a pulse when the flip-flop 23 turns on to reset the counter 32. A second differentiating circuit containing a capacitor 36, a resistor 37 and a diode 38 connected to the complimentary output 39 of the flip-flop 23 produces a pulse when the flip-flop 23 turns off to reset the counter again. Thus the counter 32 begins a new counting cycle each time the flip-flop 23 turns off or on.

The outputs of the counter 32 are applied to a plurality of AND gates **40*a*, 40*b* . . . 40*x* which decode the binary output of the counter 32 to produce respective output signals at discrete times or counts of the counter 32. The outputs of the AND gates 40*a*, 40*b* . . . 40*x* are applied to first inputs of a plurality of gates 41*a*, 41*b* . . . 41*x* of an on selecting circuit 42. Second inputs of the AND gates 41*a*, 41*b* . . . 41*x* are connected to the complimentary output 39 of the flip-flop 23 to enable the AND gates 41*a*, 41*b* . . . 41*x* only when the flip-flop 23 is off. Third inputs of the AND gates 41*a*, 41*b* . . . 41*x* are connected to switches 43*a*, 43*b* . . . 43*x* connected to a suitable source. One of the switches 43*a*, 43*b* . . . 43*x* is selectively closed to select the on time of the flip-flop 23**.

Similarly, an off selecting circuit 46 has a plurality of AND gates **47*a*, 47*b* . . . 47*x* with respective first inputs connected to the outputs of the AND gates 40*a*, 40*b* . . . 40*x*. Second inputs of the AND gates 47*a*, 47*b* . . . 47*x* are connected to the output 21 of the flip-flop 23 so that the AND gates 47*a*, 47*b* . . . 47*x* are enabled only when the flip-flop 23 is on. Third inputs of the AND gates 47*a*, 47*b* . . . 47*x* are connected to switches 48*a*, 48*b* . . . 48*x* connected to the suitable source. Thus selectively closing one of the switches 48*a*, 48*b* . . . 48*x* selects a predetermined count of the counter 32 to turn the flip-flop 23 off. Since the counter 32 is reset each time the flip-flop 23 is turned on or off, the on time of the flip-flop 23 and the off time of the flip-flop 23** are independent of each other.

The above-described embodiment of the invention is simply illustrative of the principles of the invention and many embodiments may be devised without departing from the scope and spirit of the invention. For example, the circuit described utilizes AND function gates. It is well known that many gating or circuit arrangements utilizing OR gates, NAND gates, NOR gates, etc. can be devised with properly selected input and output logic levels to produce a fully equivalent operation.

What is claimed is:

1. A pulse generator comprising:

a first relay having a pair of make contacts;

a second relay having a pair of break contacts which are connected in series with the make contacts;

bistable means having first and second states for operating the first relay to close the make contacts when the bistable means is in the first state;

monostable means operated by the bistable means when the bistable means changes from the first state to the second state for operating the second relay to open the break contacts; and timing means for changing the bistable means to the first state after a first predetermined interval and for changing the bistable means to the second state after a second predetermined interval.

2. A pulse generator as defined in claim 1 wherein the timing means includes:

counting means for producing signals on a plurality of outputs at discrete times;

on selecting means operative only when the bistable means is in a second state for changing the bistable means from the second state to the first state; and off selecting means operative only when the bistable means is in the first state for changing the bistable means from the first state to the second state.

3. A pulse generator as defined in claim 2 which includes:

means for resetting the counting means when the bistable means changes from the first state to the second state and for resetting the counting means when the bistable means changes from the second state to the first state.

4. A circuit for producing pulsed signals comprising:

a signal source;

a first relay having a pair of make contacts;

a second relay having a pair of break contacts;

the signal source, the make contacts and the break contacts being connected in series;

a flip-flop for operating the first relay when the flip-flop is in a first state;

a monostable multivibrator triggered by the flip-flop for operating the second relay when the flip-flop changes from the first state to a second state;

an oscillator;

a binary counting means responsive to the oscillator for producing signals on a plurality of outputs at discrete times;

a first plurality of AND gates having (1) respective first inputs connected to each of the plurality of outputs of the binary counting means, (2) second inputs activated by the flip-flop when the flip-flop is in the second state, (3) third inputs connected to a first switching means for selectively activating one of the third inputs of the first plurality of gates, and (4) outputs for changing the flip-flop from the second state to the first state; and a second plurality of AND gates having (1) respective first inputs connected to each of the plurality of outputs of the binary counting means, (2) second inputs activated by the flip-flop when the flip-flop is in the first state, (3) third inputs connected to a second switching means for selectively activating one of the third inputs of the second plurality of AND gates and (4) outputs for changing the flip-flop from the first state to the second state.

5. A circuit as defined in claim 4 which includes:

means for resetting the binary counting means when the flip-flop changes from the first state to the second state and for resetting the binary counting means when the flip-flop changes from the second state to the first state.

6. A circuit as defined in claim 4 which includes delay means interposed between the flip-flop and the monostable multivibrator.

* * * * *